United States Patent
Albert et al.

(10) Patent No.: US 10,441,931 B2
(45) Date of Patent: Oct. 15, 2019

(54) REACTOR AND METHOD FOR EQUILIBRIUM-LIMITED REACTIONS

(71) Applicant: Siemens Aktiengesellschaft, Munich (DE)

(72) Inventors: Jakob Albert, Erlangen (DE); Manfred Baldauf, Erlangen (DE); Katharina Meltzer, Erlangen (DE); Jenny Reichert, Schwanfeld (DE); Alexander Tremel, Möhrendorf (DE); Peter Wasserscheid, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/307,932

(22) PCT Filed: Jun. 9, 2017

(86) PCT No.: PCT/EP2017/064080
§ 371 (c)(1),
(2) Date: Dec. 6, 2018

(87) PCT Pub. No.: WO2017/212016
PCT Pub. Date: Dec. 14, 2017

(65) Prior Publication Data
US 2019/0217267 A1    Jul. 18, 2019

(30) Foreign Application Priority Data
Jun. 9, 2016  (DE) .................. 10 2016 210 224

(51) Int. Cl.
*B01J 8/10*   (2006.01)
*B01J 8/02*   (2006.01)
*B01J 8/22*   (2006.01)

(52) U.S. Cl.
CPC ........... *B01J 8/0257* (2013.01); *B01J 8/0278* (2013.01); *B01J 8/10* (2013.01); *B01J 8/222* (2013.01);
(Continued)

(58) Field of Classification Search
CPC .... B01J 2208/00884; B01J 2208/00876; B01J 2208/00938; B01J 2208/00814;
(Continued)

(56) References Cited

U.S. PATENT DOCUMENTS 4,594,228 A * 6/1986 Lambert, Jr. ........ B01F 7/00641
261/93
4,863,497 A * 9/1989 Grenier .................. B01J 8/0214
96/123
(Continued)

FOREIGN PATENT DOCUMENTS

CN  204147861 U * 2/2015
DE  10104849 A1 * 7/2001 ............ B01F 7/0075
(Continued)

*Primary Examiner* — Huy Tram Nguyen
(74) *Attorney, Agent, or Firm* — Slayden Grubert Beard PLLC

(57) ABSTRACT

Various embodiments include a reactor for implementation of equilibrium-limited reactions comprising: a reaction space; a reactant feed; an outlet for reaction products; a device for accommodating catalyst material; and a stirrer device comprising: a hollow shaft with a gas inlet opening at one end of the hollow shaft; a first stirrer paddle with gas exit orifices mounted on the hollow shaft; and a second stirrer paddle mounted on the hollow shaft proximate the device for accommodating the catalyst material.

9 Claims, 2 Drawing Sheets

(52) U.S. Cl.
CPC ............... *B01J 2208/00814* (2013.01); *B01J 2208/00876* (2013.01); *B01J 2208/00884* (2013.01); *B01J 2208/00938* (2013.01)

(58) Field of Classification Search
CPC ........ B01J 8/0257; B01J 8/0278; B01J 8/222; B01J 8/10
USPC ........................................................ 422/211
See application file for complete search history.

(56) References Cited

U.S. PATENT DOCUMENTS

| | | | | |
|---|---|---|---|---|
| 5,234,883 | A | * | 8/1993 | Schaefer-Sindlinger .................... B01J 8/0278 502/339 |
| 5,759,242 | A | * | 6/1998 | Smolarek ........... B01D 53/0431 96/149 |
| 5,779,995 | A | * | 7/1998 | Witt ....................... B01J 8/1836 422/215 |
| 2002/0110508 | A1 | * | 8/2002 | Campo ............... B01F 3/04539 423/138 |
| 2004/0179983 | A1 | * | 9/2004 | Balan .................. B01D 29/018 422/227 |
| 2006/0247322 | A1 | * | 11/2006 | Li .............................. B01J 8/10 516/33 |

FOREIGN PATENT DOCUMENTS

| | | | | |
|---|---|---|---|---|
| EP | 0331112 | A1 | * | 9/1989 ............... B01J 2/16 |
| GB | 695301 | A | * | 8/1953 |

\* cited by examiner

REACTOR AND METHOD FOR EQUILIBRIUM-LIMITED REACTIONS

CROSS-REFERENCE TO RELATED APPLICATIONS

This application is a U.S. National Stage Application of International Application No. PCT/EP2017/064080 filed Jun. 9, 2017, which designates the United States of America, and claims priority to DE Application No. 10 2016 210 224.9 filed Jun. 9, 2016, the contents of which are hereby incorporated by reference in their entirety.

TECHNICAL FIELD

The present disclosure relates to reactors and chemical reactions. Various embodiments may include a reactor and/or a method of implementing equilibrium-limited reactions.

BACKGROUND

Conversion in chemical reactions is limited by the equilibrium position of the reaction. If the chemical equilibrium in a synthesis reaction is only partly to the side of the products, a one-stage reaction regime leads only to partial conversion. If, by contrast, the reaction products are removed continuously from the reactor, continuous conversion of reactants to products takes place in the reactor.

Many of the chemical reactions of economic relevance are equilibrium-limited. In chemical synthesis, these are, for example, the production of methanol from hydrogen, carbon monoxide and/or carbon dioxide, for the production of ammonia from hydrogen and nitrogen, called the Haber-Bosch process. These reactions nowadays take place in heterogeneous catalyzed fixed bed reactors or slurry reactors. The reactants here are only partly converted in a single pass through the reactor. Thereafter, the reactant/product mixture is drawn off, the reaction products are typically separated off and unconverted reactants are recirculated to the reactor inlet.

The recirculation of volumes of gas that are large in some cases leads to high apparatus complexity. The pressure drop in the recirculation has to be compensated for by means of a compression unit. This is usually operated at high temperatures and leads to high costs and high energy expenditure. Moreover, the recirculation results in accumulation of inert gases and extraneous gases in the circuit, which has adverse effects on the reaction regime.

SUMMARY

The teachings of the present disclosure may be embodied in a method and/or a reaction system for implementation of equilibrium-limited reactions which, by comparison with the prior art, bring about a higher yield in the reaction regime and at the same time require lower technical complexity. As an example, some embodiments may include a reactor for implementation of equilibrium-limited reactions, comprising a reaction space (4) having a reactant feed device (6), an outlet device (8) for reaction products (10), and a device for accommodating catalyst material (14) and a stirrer device (16), characterized in that the stirrer device (16) comprises a hollow shaft (18), at one end of which is provided a gas inlet opening (20), and in that a first stirrer paddle (22) having gas exit orifices (24) is provided on the hollow shaft (18), and a second stirrer paddle (26) is also disposed on the hollow shaft (18) in the region of the device (12) for accommodating the catalyst material (14).

In some embodiments, a liquid phase zone (30) is provided in a lower region (28) of the reactor (2) and a gas phase zone (32) is present above it, where the first stirrer paddle (22) is disposed in the region of the liquid phase zone (30) and the second stirrer paddle (26) is disposed in the gas phase zone (32).

In some embodiments, a liquid sorbent (40) is present in the liquid phase zone (32).

In some embodiments, the second stirrer paddle (26) is configured in the form of a radially conveying stirrer.

In some embodiments, the extent (34) of the first stirrer paddle (22) radially to the hollow shaft (18) is between 20% and 30% of the reactor diameter (36).

In some embodiments, the effective velocity of the first stirrer paddle (22) is between 5 m/s and 15 m/s.

As another example, some embodiments may include a method of implementing equilibrium-limited reactions, comprising the following steps: disposing a catalyst material (14) in a reactor (2), introducing reactants (7) into the reactor (2), and reacting the reactants (7) to give a product (2). A stirrer apparatus (16) is provided, by means of which a gas mixture (38) is sucked in proceeding from an upper region (27) of the reactor (2) and is guided through a hollow shaft (18) into a lower region (28) of the reactor, wherein the gas mixture (38) is discharged from gas exit orifices (24) in a first stirrer paddle (26) mounted on the hollow shaft (18) and thence guided back into an upper region (27) of the reactor (2), in the course of which it flows through the catalyst material (14) present in the reactor (2), and wherein a second stirrer paddle (26) is provided on the hollow shaft (18), by means of which dispersion of the gas mixture (38) is brought about in the region of the catalyst material (14).

In some embodiments, a liquid sorbent (40) is supplied to the reactor (2) and accumulates in a liquid phase zone (30) in a lower region (28) of the reactor (2), and the first stirrer paddle (22) discharges the gas mixture (38) in the liquid phase zone (30).

In some embodiments, the second stirrer paddle (26) present in a gas phase zone (32) above the liquid phase zone (30) distributes the gas mixture (38) in radial direction.

BRIEF DESCRIPTION OF THE DRAWINGS

Further configurations and further features of the teachings herein are elucidated in detail with reference to the figures which follow. These are merely illustrative configurations that do not constitute any restriction of the scope of protection. Features that bear the same designation and are present in different configuration are given the same reference numerals in the different figures.

The figures show.

DETAILED DESCRIPTION

Figure 1:
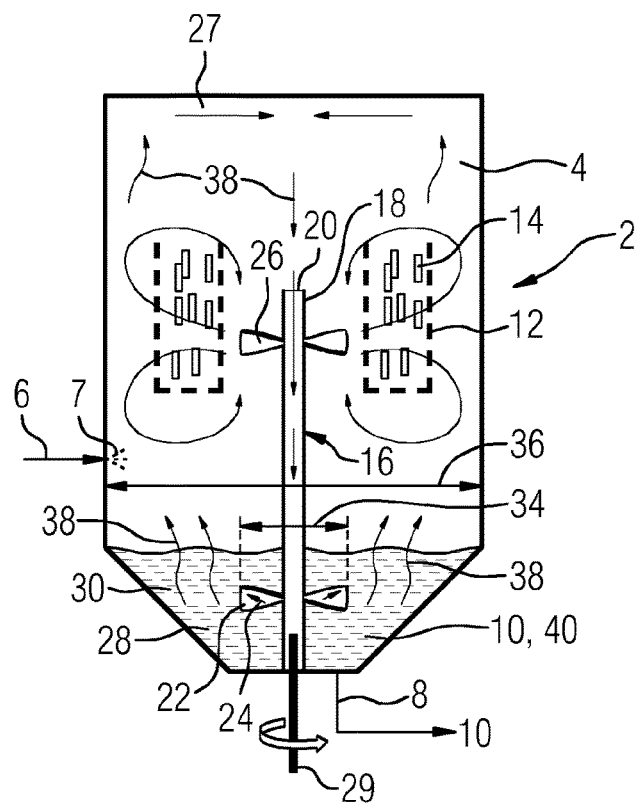
FIG. 1 a reactor having a catalyst material and a stirrer apparatus, wherein the stirrer apparatus in the reactor is driven from below, incorporating teachings of the present disclosure.

The teachings of the present disclosure may be embodied in a reactor for implementation of equilibrium-limited reactions. The reactor may comprise a reaction space having a reactant feed device, an outlet device for reaction products, and a device for accommodating catalyst material and a stirrer device. In some embodiments, the stirrer device comprises a hollow shaft, at one end of which is provided a gas inlet opening, and that a first stirrer paddle having a gas exit orifice is provided on the hollow shaft. In addition, a second stirrer paddle is disposed on the hollow shaft in the region of the device for accommodating the catalyst material.

As a result of the gas mixture being sucked in by what is called an intake stirrer from an upper reactor region and this gas mixture, which generally consists of a mixture of reactants and products of the reaction, being led off, the effect is that an axial flow velocity relative to the height of the reactor is established. The hollow shaft in combination with the first stirrer paddle functions as a self-aspirating compressor. Use of this stirrer apparatus described enables an isobaric mode of operation of the reactor at high pressures without requiring an additional gas conveying unit. Moreover, the second stirrer paddle disposed in the region of the catalyst material brings about better gas mixing, particularly horizontal gas mixing, in this region, and for that reason the reactants present in the gas mixture are dispersed again around the catalyst material, and for that reason a continuous reaction process is in turn assured.

In some embodiments, a liquid phase zone is provided in a lower region of the reactor and a gas phase zone is present above it. In this case, the first stirrer paddle, the stirrer paddle with the gas exit orifices, is disposed in the region of the liquid phase zone and the second stirrer paddle is disposed in the gas phase. Especially when a liquid sorbent is present in the liquid phase zone, the products present in the gas mixture are absorbed by the sorbent. The remaining gas in the gas mixture, when it exits from the liquid phase zone, e.g. gas bubbles ascend and move into the gas phase zone, consists of reactants in a high proportion. These reactants, particularly dispersed by the second stirrer, are converted again to products in the region of the catalyst material.

In some embodiments, the second stirrer paddle may comprise a radially conveying stirrer, the effect of which is that the second stirrer paddle carries the gas mixture out of the from the hollow shaft particularly in the radially outward direction, and in so doing generates good dispersion in the region of the catalyst material.

In some embodiments, the extent of the first stirrer paddle radially to the hollow shaft is between 20% and 30% of the total reactor diameter. The terms "extent" and "stirrer paddle" denote the greatest diameter over which the one or more stirrer paddle(s) extend(s) with respect to the hollow shaft. The term "stirrer paddle" is understood in a general sense since a multitude of different stirrer units may be appropriate. It is possible here overall to control the flow of the gas mixture using sigma stirrers, alpha stirrers, INTER-MIG stirrers, MIG stirrers or disk stirrers that have different geometric configurations. The term "stirrer paddle" means any device disposed on the hollow shaft that is suitable for distribution of the gas mixture and for circulation of the liquid phase zones.

In some embodiments, the reactor is designed in such a way that, in the state of operation, it moves the stirrer paddle in such a way that an effective velocity of the stirrer paddle is between 5 m/s and 15 m/s.

Some embodiments may include a method of implementing equilibrium-limited reactions which comprises the following steps: first of all, a catalyst material is disposed in the reactor, and one or more reactants are also introduced into the reactor, which results in reaction of the reactants to give a product, with provision of a stirrer apparatus, by means of which a gas mixture is sucked in proceeding from an upper region of the reactor and is guided through a hollow shaft into a lower region of the reactor. The gas mixture is discharged there from gas exit orifices into a first stirrer paddle mounted on the hollow shaft. Thence the gas mixture thus discharged is guided back into an upper region of the reactor, in the course of which it flows through the catalyst material present in the reactor. Also provided is a further stirrer paddle on the hollow shaft, by means of which dispersion of the gas mixture is brought about in the region of the catalyst material.

In this context, the same features that have already been described with regard to the reactor arise with regard to the method described; the circulation results in a flow within the gas mixture and hence within the reaction space, which enables an isobaric mode of operation at high pressures. Especially when a liquid phase zone is present in the lower region of the reactor, especially with a sorbent as liquid, the introduction of gas in the liquid phase zone results in gas bubbles which have a high mass transfer area with the liquid, preferably in the sorbent, and hence enable effective mass transfer, i.e. of the products, to the sorbent. At the same time, good mixing of the liquid also takes place.

The reactor 2 according to FIG. 1 has a reaction space 4, a reactant feed device 6 for feeding of reactants 7, and an outlet device 8 for products 10. In addition, the reactor 2 has a device 12 for accommodating catalyst material 14. The device 12 may be configured as a basket or mesh in which the catalyst material is present. The catalyst material 14 may take the form of a bed in the device 12, but it may also be disposed in multiple planes or layers in the device 12 for improvement of flow.

In some embodiments, the reactor 2 comprises a stirrer device 16 which in turn comprises a hollow shaft 18, wherein a gas inlet orifice 20 is provided on the hollow shaft 18 in an upper region 27 of the reactor. In addition, a first stirrer paddle 22 with gas exit orifices 24 is disposed on the hollow shaft 18 in a lower region 28 of the reactor. As a result of the rotation of the stirrer device 16, a gas mixture 38 is sucked in from the lower region 27 of the reactor 2 into the gas inlet orifice 20 of the hollow shaft 18 and guided downward within the hollow shaft 18 in the direction of the first stirrer paddle.

The rotation of the stirrer paddle is similar to that of a compressor that causes the aspiration of the gas mixture 38. The gas mixture 38, which is basically essentially a mixture of gaseous reactants 7 and gaseous products 10, is introduced here from the gas exit orifices 24 of the first stirrer paddle 22 into a liquid phase zone 30. This liquid phase zone 30 essentially comprises a sorbent 40, which is in liquid form here, and serves to absorb reaction products 10 from the reactor and ultimately to lead them off from the reactor 2. The liquid sorbent 40 accumulates in the liquid phase zone 28, but this does not mean that liquid sorbent 40 is also present in the rest of the reaction space 4, for example in droplet form. The supply and removal of the sorbent 40 will not be discussed in detail here. It should be pointed out that the sorbent 40 is also led off via the outlet device 8 for products 10 and supplied to a separation process which is not described here in detail. Correspondingly, the sorbent 40 is likewise supplied back to the reactor 2 or to the reaction space 4 by means of a sorbent feed device which is not described in detail here.

The stirrer device 16 described is thus a self-aspirating gas intake stirrer, by means of which gas is guided from the upper reaction region into the lower region 28 of the reactor. As described, the gas bubbles that exit from the second stirrer paddle facilitate the combination of the products present in these gas bubbles with the sorbent. At the same time, the gas mixture 38 is depleted of the products; when this depleted gas mixture 38 now exits from the liquid phase zone in the form of gas bubbles, it ascends again, caused by the aspiration at the gas inlet orifice 20 of the hollow shaft 18 in the upward direction, and in so doing passes the region in which the catalyst material 14 is disposed.

Since the gas mixture 38 is now rich in reactants again, this means a shift in the equilibrium state in the direction of the reactants when this gas mixture meets the catalyst material. There is again a reaction of the reactants to give the reaction products until an equilibrium state is established again. In order to optimize this reaction at the surface of the catalyst material 14, the aim is to disperse the gas mixture 38 with maximum efficiency around the catalyst material 14 and through its surface. For this purpose, a second stirrer paddle 26 is provided on the hollow shaft 18, which is especially configured as a radial stirrer. Examples of a stirrer of this kind with a conveying direction generated mainly in radial form are disk stirrers, impeller stirrers, cross-beam stirrers or anchor stirrers. The second stirrer paddle 26 has an extent based on the reactor diameter that relates to between 20% and 35% of this reactor diameter. The effective velocity of the second stirrer paddle is between 3 m/s and 6 m/s.

The gas mixture 38 provided above the region in which the catalyst material 14 is disposed is accordingly enriched again in reaction products. It thus comprises reactants that have not been converted over the catalyst material 14 in the equilibrium state of the reaction and reaction products. This gas mixture 38 is in turn aspirated by the stirrer apparatus and re-enters the hollow shaft in the gas inlet orifice 20, and the circulation process described begins again.

It should be noted that it has likewise been found to be appropriate when the first stirrer paddle has an extent 34 between 20% and 30% of the diameter 36 of the reactor space 4.

FIG. 1 shows a stirrer apparatus 16 that has a drive 29 in the lower region 28 of the reactor 2. Analogously, in FIG. 2, a drive 29 of the stirrer apparatus 16 is disposed in the upper region 27.

Figure 2:
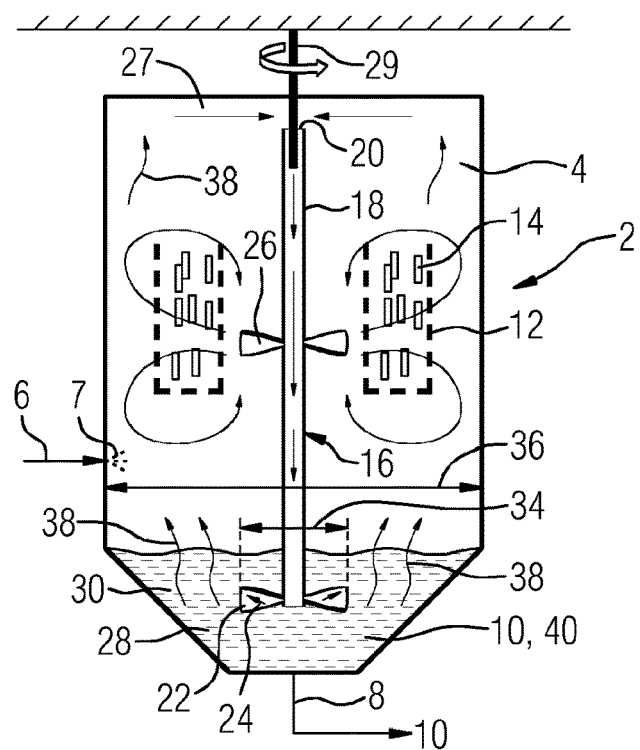
FIG. 2 a reactor analogous to that from FIG. 1, in which the stirrer apparatus is driven from above.
Figure 3:
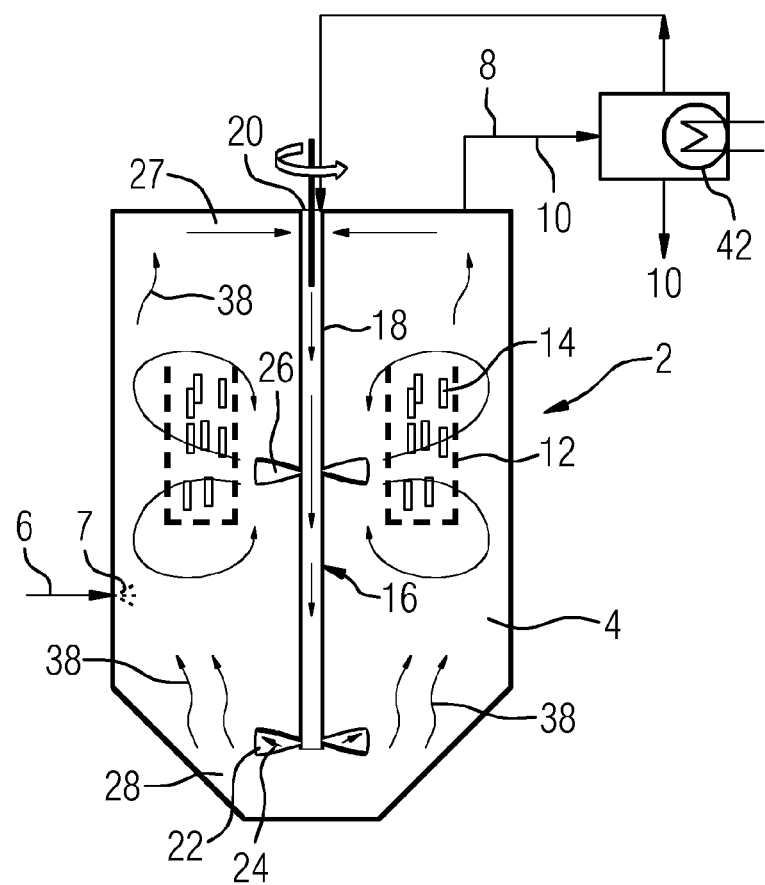
FIG. 3 a reactor as in FIG. 1, wherein the reactor is operated in such a way that the products are in gaseous form in the prevailing atmosphere.

The reactor 2 according to FIG. 3 differs from the two reactors according to FIGS. 1 and 2 in that the thermodynamic conditions therein are configured in such a form that no sorbent 40 is required, and the products 10 are instead removed from the reaction space 4 in gaseous form. The gas inlet orifice 20 of the hollow shaft is configured such that it is mounted outside the reaction space 4. In this arrangement, it is possible to dispense with a sorbent 40 since it is not required to shift the equilibrium in this case. However, the liquid phase could, for example, take the form of a heat carrier oil, which, however, is not shown in this diagram. The gas stream 38 laden with reaction products 10 is discharged from the reaction space 4 and cooled; for this purpose, a cooling apparatus 42 is provided. In this way, reaction products 10, for example water and methanol, are condensed out, and heat of reaction can additionally be removed. The remaining gas stream is then sucked in again through the first stirrer paddle and recycled into the reaction space 4. Thus, the gas recirculation is maintained by means of the stirrer device 16 alone without an additional fan. The continuous removal of condensed reaction products 10 shifts the reaction equilibrium analogously to absorption by the absorbent. In addition, the condensation of products in the region outside the reaction space 2 could lead to a pressure drop that then promotes the flow of the gas stream.

It should also be pointed out that a multitude of syntheses are suitable for the described reaction process in the reactor 2. For example, in the case of production of methanol from hydrogen and a carbon oxide, the reaction is equilibrium-limited. Therefore, the synthesis of methanol from the reactants mentioned is performable very efficiently in one of the reactors described. Moreover, the synthesis of ammonia from hydrogen and nitrogen based on the conventional Haber-Bosch process is also suitable for operation in the reactor described.

What is claimed is:

1. A reactor for implementation of equilibrium-limited reactions, the reactor comprising:
    a reaction space;
    a reactant feed;
    an outlet for reaction products;
    a device for accommodating catalyst material; and
    a stirrer device comprising:
        a hollow shaft with a gas inlet opening at one end of the hollow shaft;
        a first stirrer paddle with gas exit orifices mounted on the hollow shaft; and
        a second stirrer paddle mounted on the hollow shaft proximate the device for accommodating the catalyst material.

2. The reactor as claimed in claim 1, further comprising:
    a liquid phase zone in a lower region of the reaction space; and
    a gas phase zone above the liquid phase zone;
    wherein the first stirrer paddle is disposed in the liquid phase zone and the second stirrer paddle is disposed in the gas phase zone.

3. The reactor as claimed in claim 2, further comprising a liquid sorbent disposed in the liquid phase zone.

4. The reactor as claimed in claim 1, wherein the second stirrer paddle comprises a radially conveying stirrer.

5. The reactor as claimed in claim 1, wherein the first stirrer paddle extends radially with respect to the hollow shaft between 20% and 30% of a diameter of the reactor space.

6. The reactor as claimed in claim 1, wherein an effective velocity of the first stirrer paddle is between 5 m/s and 15 m/s.

7. A method of implementing equilibrium-limited reactions, the method comprising:
    introducing a catalyst material into a reactor;
    introducing reactants into the reactor;
    stirring the reactants with a stirrer comprising a hollow shaft;
    reacting the reactants resulting in a product; and
    transporting a gas mixture from an upper region of the reactor through the hollow shaft into a lower region of the reactor;
    wherein the stirrer sucks in the gas mixture and discharges the gas mixture from gas exit orifices in a first stirrer paddle mounted on the hollow shaft into the catalyst mixture; and
    a second stirrer paddle mounted on the hollow shaft disperses the gas mixture throughout the catalyst material.

8. The method as claimed in claim 7, further comprising supplying a liquid sorbent to the reactor;
    wherein the liquid sorbent accumulates in a liquid phase zone in the lower region; and discharging the gas mixture into the liquid phase zone with the first stirrer paddle.

9. The method as claimed in claim 8, further comprising distributing the gas mixture in a radial direction with the second stirrer paddle in a gas phase zone above the liquid phase zone.

\* \* \* \* \*